United States Patent [19]
Staplin et al.

[11] Patent Number: 5,888,074
[45] Date of Patent: Mar. 30, 1999

[54] SYSTEM FOR TESTING AND EVALUATING DRIVER SITUATIONAL AWARENESS

[75] Inventors: Loren Staplin, Allentown; Kenneth W. Gish, Bensalem, both of Pa.; Albert H. Kirchner, III, Great Falls, Va.

[73] Assignee: Scientex Corporation, Arlington, Va.

[21] Appl. No.: 714,779

[22] Filed: Sep. 16, 1996

[51] Int. Cl.⁶ .................................................. G09B 5/00
[52] U.S. Cl. ........................... 434/258; 434/64; 434/65; 434/307 R; 351/239; 340/576
[58] Field of Search .................. 434/63–66, 71, 434/29, 81, 236, 238, 247, 258, 271, 307 R, 338, 353, 362; 351/203, 205, 211, 224, 239, 243, 246; 180/287, 272; 600/558; 340/543, 576; 348/61, 115, 118, 121; 345/7, 121, 156

[56] References Cited

U.S. PATENT DOCUMENTS

| | | | |
|---|---|---|---|
| 3,008,000 | 11/1961 | Morchand | 434/307 R X |
| 3,357,115 | 12/1967 | Kelley | 434/258 |
| 3,869,812 | 3/1975 | Arakelian et al. | 434/258 |
| 3,883,235 | 5/1975 | Lynn et al. | 351/246 |
| 3,971,143 | 7/1976 | Slomski | 434/258 |
| 4,057,911 | 11/1977 | Sack | 434/64 |
| 4,325,697 | 4/1982 | Regan et al. | 434/258 |
| 4,486,180 | 12/1984 | Riley | 434/65 |
| 4,518,361 | 5/1985 | Conway | 434/362 X |
| 4,541,806 | 9/1985 | Zimmerman et al. | 434/258 |
| 4,740,072 | 4/1988 | Griffin et al. | 351/243 |
| 4,742,389 | 5/1988 | Schiffman | 348/115 |
| 4,861,154 | 8/1989 | Sherwin et al. | 351/205 |
| 4,885,687 | 12/1989 | Carey | 434/258 X |
| 5,224,566 | 7/1993 | Stepanian et al. | 340/543 |
| 5,344,324 | 9/1994 | O'Donnell et al. | 340/576 X |
| 5,366,376 | 11/1994 | Copperman et al. | 434/69 |
| 5,374,193 | 12/1994 | Trachtman | 434/258 |
| 5,420,652 | 5/1995 | Fujieda | 351/239 |
| 5,474,453 | 12/1995 | Copperman et al. | 434/65 X |
| 5,529,498 | 6/1996 | Cassily et al. | 434/258 |
| 5,595,488 | 1/1997 | Gozlan et al. | 434/236 |

*Primary Examiner*—Joe H. Cheng
*Attorney, Agent, or Firm*—Hazel & Thomas, P.C.

[57] ABSTRACT

A system for testing and evaluating driver situational awareness incorporates a device for displaying road and traffic images to a subject being tested, road and traffic image data for simulating operation of a vehicle to be outputted on the display device, instruction data to be outputted at least on the display device, input devices for inputting response data from the test subject in response to road and traffic image data generated on the display means, and a control device for controlling the operation of the system. The control device incorporates a vision test component for conducting a vision test of the subject and a driving reaction test component for conducting a driving reaction test of the subject. Each of the vision and driving reaction tests includes generating road and traffic image data for simulating operation of a vehicle, generating instruction data in coordination with the image data for providing instructions for the subject, monitoring for inputting of response data, and determining whether the inputted response data is correct or incorrect. The generated image data includes road and traffic video image data, test pattern image data and situation test image data. The test pattern image data is structured to test static visual acuity, static visual contrast sensitivity, dynamic visual acuity, dynamic visual contrast sensitivity and angular motion sensitivity. The situation test image data is structured to test divided attention capacity, selective attention capacity, attention switching, working memory functions, brake reaction time, and complex reaction time and decision making.

14 Claims, 7 Drawing Sheets

SYSTEM FOR TESTING AND EVALUATING DRIVER SITUATIONAL AWARENESS

The U.S. Government has a paid-up license in this invention and the right in limited circumstances to require the patent owner to license others on reasonable terms as provided for by the terms of Contract No. DTNH22-93-C-05237 awarded by the U.S. Department of Transportation.

BACKGROUND OF THE INVENTION

1. Field of the Invention

The present invention relates generally to a system for the testing and evaluation of the situational awareness competencies and capabilities of drivers. In particular, the system is directed to testing and evaluating whether drivers exhibit minimum levels of visual detection and perception of moving as well as stationary targets and attentional/decision-making capability to remain competent in operating a vehicle.

2. Description of the Prior Art

Currently, when individuals apply for drivers' licenses, the testing of such individuals for their competency in operating a vehicle is generally limited to a written test, a summary vision test and a road test. As one would expect, the written test evaluates one's knowledge of the regulation and the established "rules-of-the-road." Conventional vision tests used by drivers testing agencies are typically limited to verifying an individual's static acuity and depth perception. When applicable, road tests under the supervision of a police officer or an examining official are used to check the individual's basic competence in maneuvering a vehicle and use of established conventions in operating the vehicle in traffic (e.g., using a signal when turning, following road signs.

However, there exists no system today that uses a standardized, objective procedure to test an individual's visual detection and perception of moving as well as stationary targets and attentional/decision-making capability in order to evaluate their situational awareness and responsiveness. As is well known, when driving, individuals are constantly bombarded by sensory inputs from the surrounding environment. The view of the road on which the individual is traveling, the sight of traffic lights and road signs, the readings on the instrument panel, the output of a radio, the temperature inside and outside the vehicle, the sound of the engine, the noise of other cars and pedestrians, conversation within the vehicle, etc. all contribute to the barrage of information that the driver must process and evaluate while operating the vehicle. Such sensory inputs do not even include unexpected occurrences such as another vehicle suddenly stopping, changing lanes or turning, pedestrians or animals stepping out in front of moving vehicles, and unnoticed road hazards (e.g., slick or icy patches on the road). Clearly, in order to operate the vehicle safely and successfully negotiate both common driving situations, unexpected hazards, the driver must have a sufficient level of situational awareness to understand the current circumstances and react accordingly. Generally, most licensed drivers possess what would be considered minimally acceptable levels of situational awareness.

Studies have shown that situational awareness, as described herein, is lowest among novice drivers, and also diminishes with age. Such declines in situational awareness stem from age-related declines in spatial vision, including static and dynamic acuity, and high-frequency spatial contrast sensitivity have been found to cause elderly individuals to experience delays in recognizing intersection features such as pavement width transitions, channelized turning lanes, island and median features across an intersection and non-reflectorized raised elements. Such individuals also experience delays in their comprehension of pavement markings and traffic signs, whereby information vital to the early stages of an individual's operation of a vehicle is, in effect, lost. When combined with attentional and decision making deficits that have been shown to increase with age, this loss of information is compounded resulting in a considerable slowdown in the driver's responsiveness. In other words, a decline in an individual's "useful field of view," selective attention and divided attention/attention switching capabilities will delay that individual's response to such situations as a change in heading or changing lanes for either avoiding a hazard or for accomplishing a desired maneuver. Such slowdowns in an individual's responsiveness are especially taxed when approaching intersections where the serial processing demands for conflict avoidance and compliance with traffic control messages and conventions increase.

Other factors that may affect the abilities of elderly individuals to effectively operate a vehicle include age-related degradations in working memory processing, and in judging distances and spatial positions. For example, a less efficient working memory process may translate into heightened degrees of risk for an elderly individual at intersections that either are geometrically complex or unfamiliar, whereby the individual having to search for and recognize navigational cues will disproportionately overburden that individual's current attention to lane-keeping and conflict avoidance. A diminished capacity to judge distances, such as the "least safe gap" ahead of oncoming vehicles, may result in the individual executing inappropriate maneuvers. Simple reaction time, while found not to be significantly slower for older drivers responding to expected stimuli under normal operating conditions, may suffer at operationally significant levels as the number and complexity of responses required to cope with unexpected stimuli (i.e., emergency situations) increases.

As a consequence, there exists a growing need to identify and evaluate the situational awareness capabilities of all those who operate vehicles on the road. This is especially important for the ever-growing population of elderly drivers, as well as novice drivers whose visual and perceptual skills suffer from lack of experience in operating a vehicle. The identification and evaluation of such persons would then aid in the process of developing countermeasures or improvements in our transportation system to compensate for such deficiencies, or mechanisms or procedures to limit or graduate the licensing of such individuals to conditions/circumstances in which their deficiencies will not be overburdened or contribute to any unacceptable hazards.

As noted earlier, there does not exist any non-driving system (i.e., excluding on-road tests) currently in use by which the full spectrum of factors that make up the situational awareness capabilities of individuals are effectively tested. Rather, current non-driving testing systems are generally limited to testing static visual acuity and depth perception. Other systems that may test for factors or abilities that are relevant to situational awareness in a driving environment are not designed or intended to test those factors or abilities in a driving application or simulation.

A need exists, therefore, for a system that effectively measures the situational awareness capabilities of individuals licensed or in the process of being licensed to operate a motor vehicle, without the exposure to risk of on-road testing unless specially warranted by diminished capabilities revealed in the non-driving testing system.

In particular, there exists a need for a system that measurably analyzes and evaluates the static and dynamic visual acuities, the static and dynamic visual contrast sensitivities, the angular motion sensitivity, the useful field of view, the divided attention and the attention switching abilities of individual drivers. That need is especially great for testing the growing elderly population, as well as novice drivers whose inexperience could compromise their ability to operate a vehicle safely.

SUMMARY OF THE INVENTION

In view of the disadvantages and shortcomings present in the prior art, a general object of the present invention is to provide a system that effectively measures the situational awareness capabilities of individuals licensed or in the process of being licensed to operate a motor vehicle.

A more specific object is to provide a system that measurably analyzes and evaluates the static and dynamic visual acuities, the static and dynamic visual contrast sensitivities, the angular motion sensitivity, the useful field of view, the divided attention and the attention switching abilities of individual drivers.

A further object is to provide a system for measuring the situational awareness capabilities of individual drivers that is easy for a test examinee to understand and operate, so that the system does not by itself overwhelm the test examinee.

Another specific object is to provide a system for evaluating the static and dynamic visual acuities, the static and dynamic visual contrast sensitivities, the angular motion sensitivity, the useful field of view, the working memory, the divided attention, the selective attention and the attention switching abilities of an individual driver using an interface with the test examinee that provides a familiar environment for the individual driver.

According to one aspect of the invention, the apparatus of the system generally incorporates means for displaying road and traffic images to a subject being tested; means for generating road and traffic image data for simulating operation of a vehicle to be outputted on the display means; means for generating instruction data to be outputted at least on the display means; means for inputting response data from the test subject in response to the generated road and traffic image data on the display means; and means for controlling operation of the display means, the image data generating means, the instruction data generating means and the inputting means. The controlling means includes a vision test component for conducting a vision test of the subject and a driving reaction test component for conducting a driving reaction test of the subject. The vision and driving reaction test components are operatively connected to the image data generating means, the instruction data generating means and the inputting means such that image data and instruction data are generated and displayed in coordination with vision and driving reaction test sequences conducted by the vision and driving reaction test components, respectively, and response data inputted through the inputting means.

According to a more specific aspect of the invention, the image data generating means incorporates road and traffic video image data, test pattern image data and situation test image data. The test pattern image data is structured to test static visual acuity, static visual contrast sensitivity, dynamic visual acuity and dynamic visual contrast sensitivity. The situation test image data is structured to test divided attention capacity, selective attention capacity, attention switching, working memory function, brake reaction time, and complex reaction time and decision making.

In a further aspect of the invention, a method for testing and evaluating driver situational awareness, incorporates the steps of providing a display through which road and traffic image data and instruction data is presented to a subject to be tested, conducting a vision test sequence with the subject, conducting a driving reaction test sequence with the subject, and providing input devices through which the subject may respond to the vision and driving reaction test sequences. The steps of conducting a vision or driving reaction test sequence each includes the steps of generating road and traffic image data for simulating operation of a vehicle to be presented on the display, generating instruction data in coordination with the image data for providing instructions for the subject during the vision and driving reaction test sequences, monitoring for inputting of response data during the vision and driving reaction test sequences, and determining whether the inputted response data is correct or incorrect.

Other objects and features of the present invention will be apparent from the following detailed description of the preferred embodiments.

BRIEF DESCRIPTION OF THE DRAWINGS

The invention will be further described in conjunction with the accompanying drawings, in which.

DETAILED DESCRIPTION OF THE PREFERRED EMBODIMENTS

Figure 1:
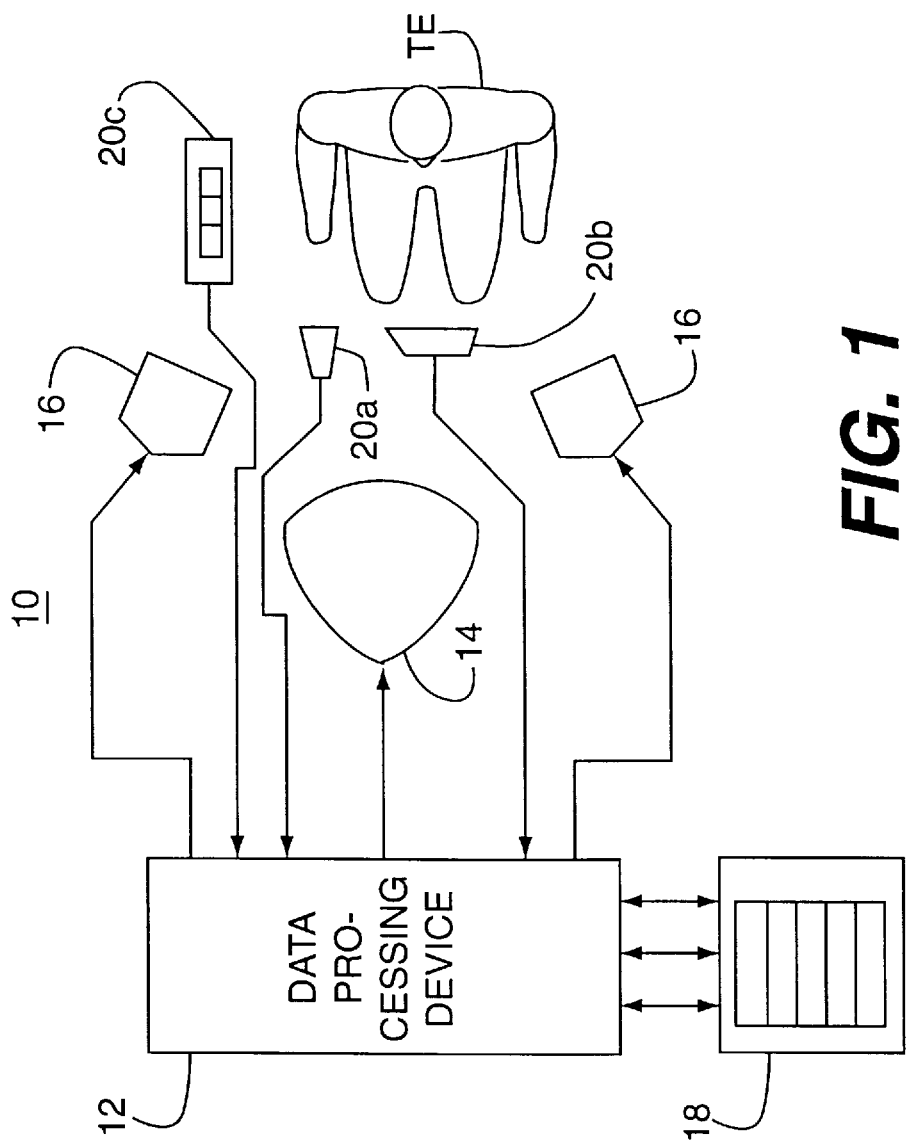
FIG. 1 illustrates a general block diagram of the hardware implementation of the system of the present invention.

With reference to the figures, like reference characters will be used to indicate like elements throughout the several embodiments and views thereof. In particular, with reference to FIG. 1, the system 10 of the present invention will be implemented, in at least one embodiment, through a data processing device 12, such as a computer, that will control the overall operation of the system 10 and each of the testing sequences conducted by the system. The data processing device 12 is connected to a display 14 and an audio output device 16 through which the testing sequences are conducted and conveyed to a test examinee TE. The data processing device 12 is further connected to a test program storage and playback device 18 on which test program data for conducting the test sequences are stored. As noted above and as will be discussed in further detail below, the test sequences utilize extensive visual and audio outputs and data in their operation. In addition, the data processing device 12 incorporates user input/interface devices 20a–20c through which the test examinee TE communicates with the system 10 and interacts with the test sequences.

In at least one embodiment of the present invention, the data processing device 12 is implemented using a 486/66

MHz-based computer with 4 MB RAM, a 540 MB hard drive and a 1 MB graphics board. The test program storage and playback 18 is implemented using a digital video storage device (e.g., a laserdisc player) connected via a serial interface to the data processing device 12. The display 14 is implemented with a 27 inch CRT with NTSC and VGA inputs, while the audio output device 16 plays a sound track recorded onto the same laser disk played by the digital video storage device 18. In a preferred embodiment, the data processing device 12 is implemented using a 486/133 MHz-based computer with 8 MB RAM, a 1 GB hard drive and a 2 MB graphics board. The test program storage and playback device 18 is implemented using a laserdisc player or other state-of-the-art digital/optical storage medium. The display 14 is a 17 inch CRT with a 0.26 mm dot pitch screen and both NTSC and VGA inputs. The audio output device 16 is again a conventional sound card with speakers all as known in the art.

In at least the first embodiment, the input/interface devices include a gas or accelerator pedal 20a, a brake pedal 20b and a three-choice input device 20c. In this embodiment, the accelerator and brake pedals 20a, 20b are used to test the test examinee TE reaction times in switching from an accelerator pedal to the brake pedal when presented different scenarios. Each of the pedals is implemented using momentary contact switches hardwired via data input lines 20d to an input/output port (e.g., the joystick port for a computer) of the data processing device 12 as would be understood by one of skill in the art. The three-choice input device 20c is used to allow the test examinee TE to input a response to a multiple-choice test sequence. This device is implemented using three momentary contact switches mounted in a box and hardwired also via data input lines 20d to the data processing device 12.

In addition to the components of the system 10 that are operatively connected to the data processing device 12, the system 10 may incorporate an optical interface 22 for adjusting the viewing distance and appearance of the display 14. The optical interface 22 is intended to give images shown on the display 14 depth and perspective that approaches a realistic appearance, in a wide field to view. In at least the preferred embodiment of the system 10, the optical interface 22 is implemented using a Fresnel lens positioned between the display 14 and the test examinee TE. One example of a Fresnel lens has a focal length of 318 mm and a diameter of 267 mm with 5 grooves/mm.

Figure 2:
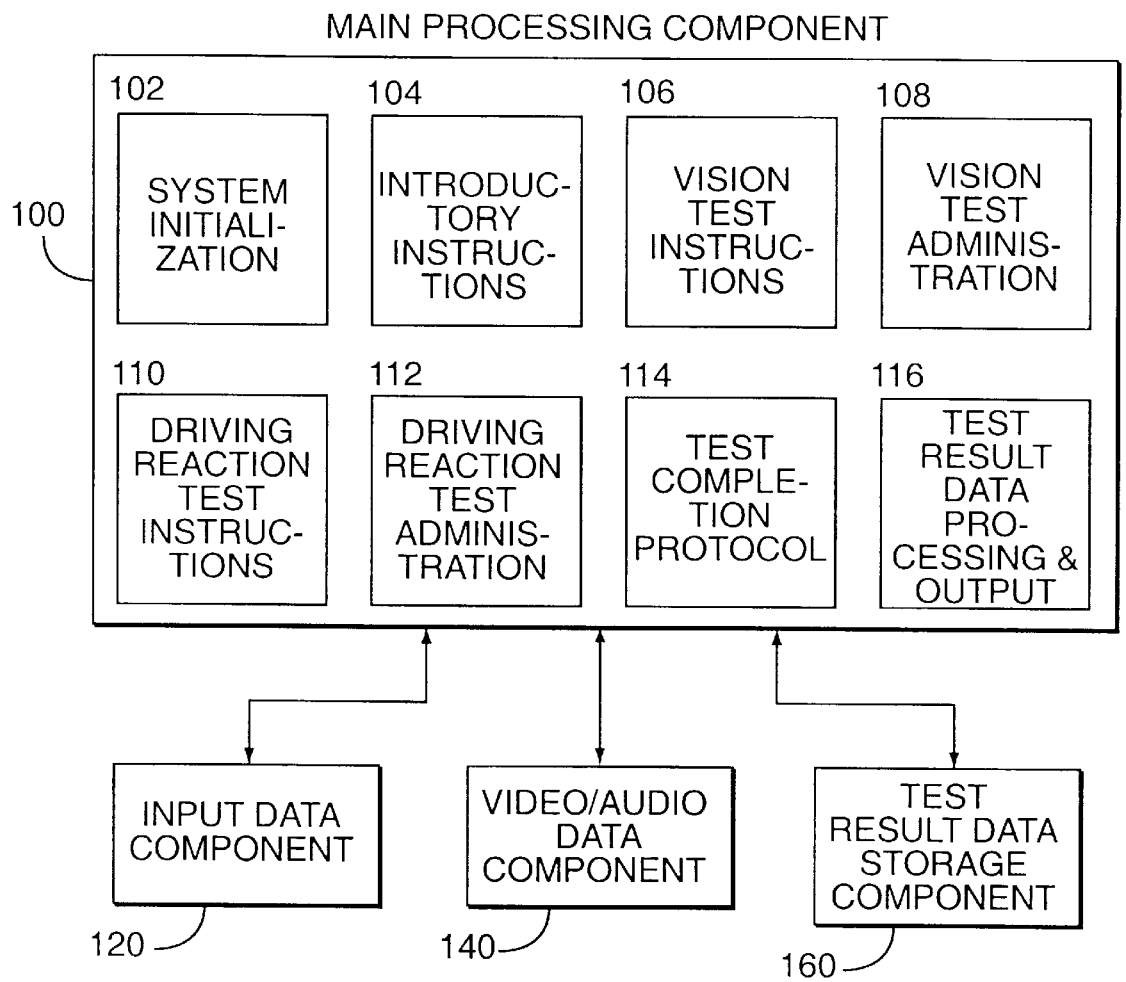
FIG. 2 illustrates a block diagram of the operational components of the present invention.

As shown in FIG. 2, the operational components of the system 10 include at least a main processing component 100, an input data component 120, a video/audio data component 140 and test result data storage component 160. The main processing component 100 encompasses the elements of the program of the system 10 that implement algorithms for, among other operations, initialization of the system 102, introductory instructions to the test examinee TE 104, vision test instructions for the test examinee 106, vision test administration 108, driving reaction test instructions 110, driving reaction test administration 112, test completion protocol 114 and test result data processing and output 116. The input data component 120 and the video/audio data component 140 are elements of the system program for accessing the data that any of the elements of the main processing component 100 may require. For example, input data component 120 embodies the data received through the hardware interfaces of the data processing device 12 connected to the user input/interface devices 20a–20c. The video/audio data component 140 embodies the video and audio data stored in the test program storage and playback device 18. The test result storage data component 160 embodies the memory storage space in which the results of the vision test, results of the driving reaction test, as well as any other data or results derived from operations internal to each of the elements of the main processing component 100 are stored.

Each of the elements in the main processing component 100 incorporates the algorithms for, among other operations, accessing the input data component 120, accessing the video/audio data component 140, input data monitoring and timer component 160 and storing data in the test result storage data component 180, the actual algorithms for each operation being structured in a manner as would be understood by one of skill in the art.

Figure 3:
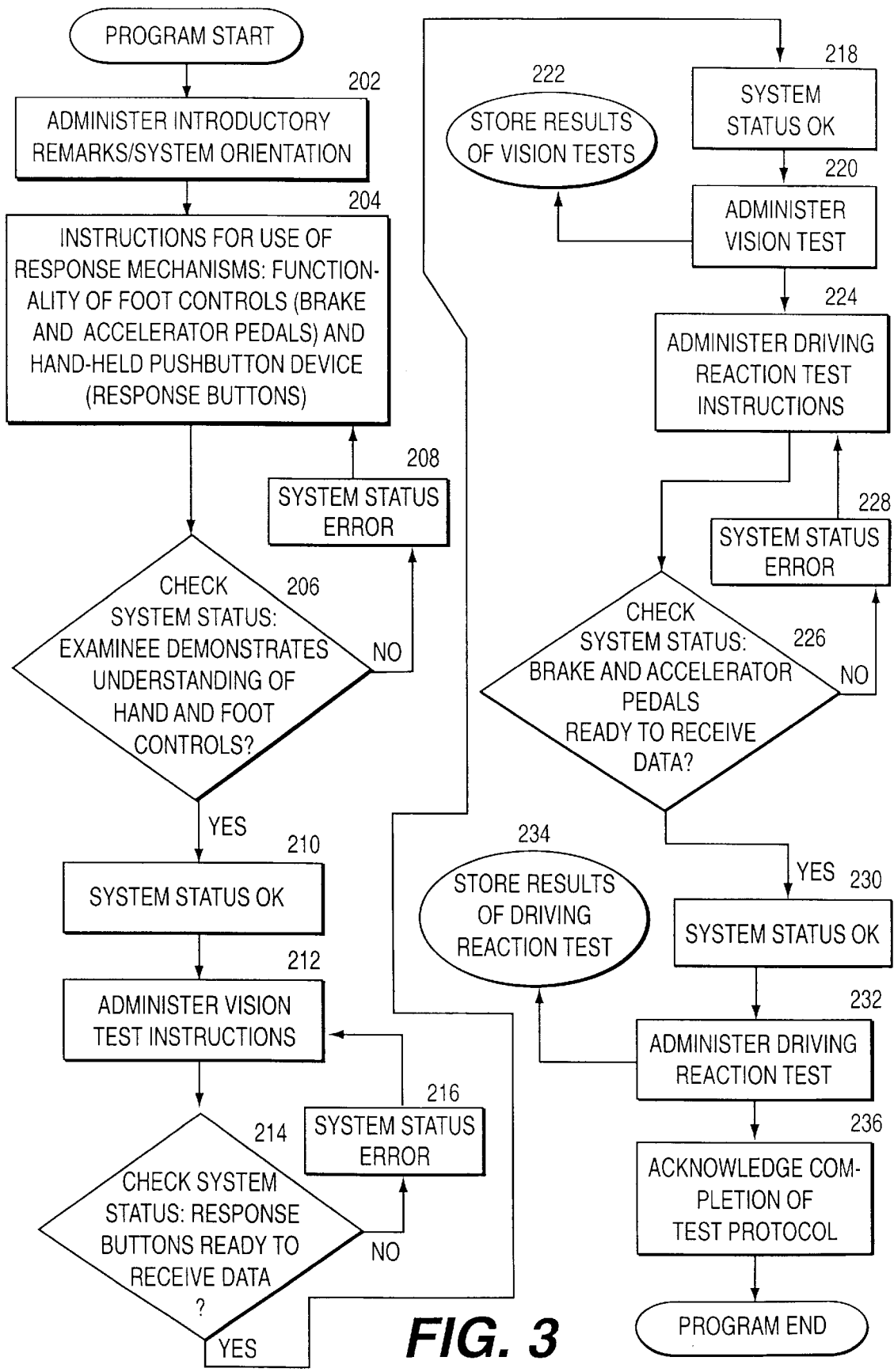
FIG. 3 illustrates a flow chart of the overall general operation of the present invention.

FIG. 3 illustrates a flow chart of the general overall operation 200 of the system 10. In this operation, the system 10 begins with the step of a narrator administering introductory remarks and giving the test examinee TE an orientation of the system (Step 202). For example, a narrator may administer the remarks and instructions using audio (voice) messages, text or picture messages, or a combination thereof. The system 10 then conducts an initial functionality and system status test of the user input/interface devices 20a–20c giving the test examinee TE instructions on how to operate each of the devices in order to test them (Step 204). The system then determines if the devices were operational and whether the test examinee has demonstrated a working understanding of the user input/interface devices 20a–20c (Step 206) based on input signals received from the devices when the test examinee operated them. If the test examinee TE has not properly operated the devices, the system signals a System Status Error (Step 208), repeats the orientation instructions (Step 204) and repeats the system status test (Step 206). If, on the other hand, the test examinee correctly operated the user input/interface devices 20a–20c, the system signals System Status OK (Step 210) and proceeds with administering the visual test sequence.

First, in at least one embodiment of the present instruction, the vision test instructions are administered to the test examinee (Step 212). Then, another system status test is conducted to determine if the three-choice input device 20c is ready for use (Step 214). If the system signals a System Status Error (Step 216), then the vision test instructions are repeated (Step 212) and the system status test is again conducted (Step 214). If, on the other hand, a System Status OK is signaled (Step 218), then the actual vision test is administered (Step 220). As the vision test is being conducted, or at the end of the vision test sequence, data on the results of the vision test are stored in the test result data component 180 (Step 222). Afterwards, the system then proceeds with administering the driving reaction test sequence.

In this test sequence, driving reaction test instructions are first administered to the test examinee (Step 224). Then, a system status test is conducted to determine if the accelerator pedal 20a and the brake pedal 20b input devices are ready for use (Step 226). If the system signals a System Status Error (Step 228), then the driving reaction test instructions are repeated (Step 224) and the system status test is again conducted (Step 226). If, on the other hand, a System Status OK is signaled (Step 230), then the actual driving reaction test is administered (Step 232). As the driving reaction test is being conducted, or at the end of the test sequence, data on the results of the driving reaction test are stored in the test result data component 180 (Step 234). Afterwards, the system then administers the protocol of acknowledging the completion of the test with the test examinee (Step 236) and ends the entire testing sequence.

Within the step of administering the introductory remarks and system orientation (Step 202), a series of video and/or audio messages are presented to the test examinee TE via the display 14 and the audio output device 16. In this step, the messages are directed to familiarizing the test examinee TE with the general purpose and nature of the tests.

In the general steps for conducting the initial functionality and system status test of the user input/interface devices (Steps 204–210), again a series of video and audio messages are presented to the test examinee TE via the display 14 and the audio output device 16. As will be explained below in connection with the actual test sequences, video and audio messages extracted from the test program storage and playback device 18 are selectively presented based on the test examinee's response to prompts and instructions presented by the video and audio messages.

Figure 4:
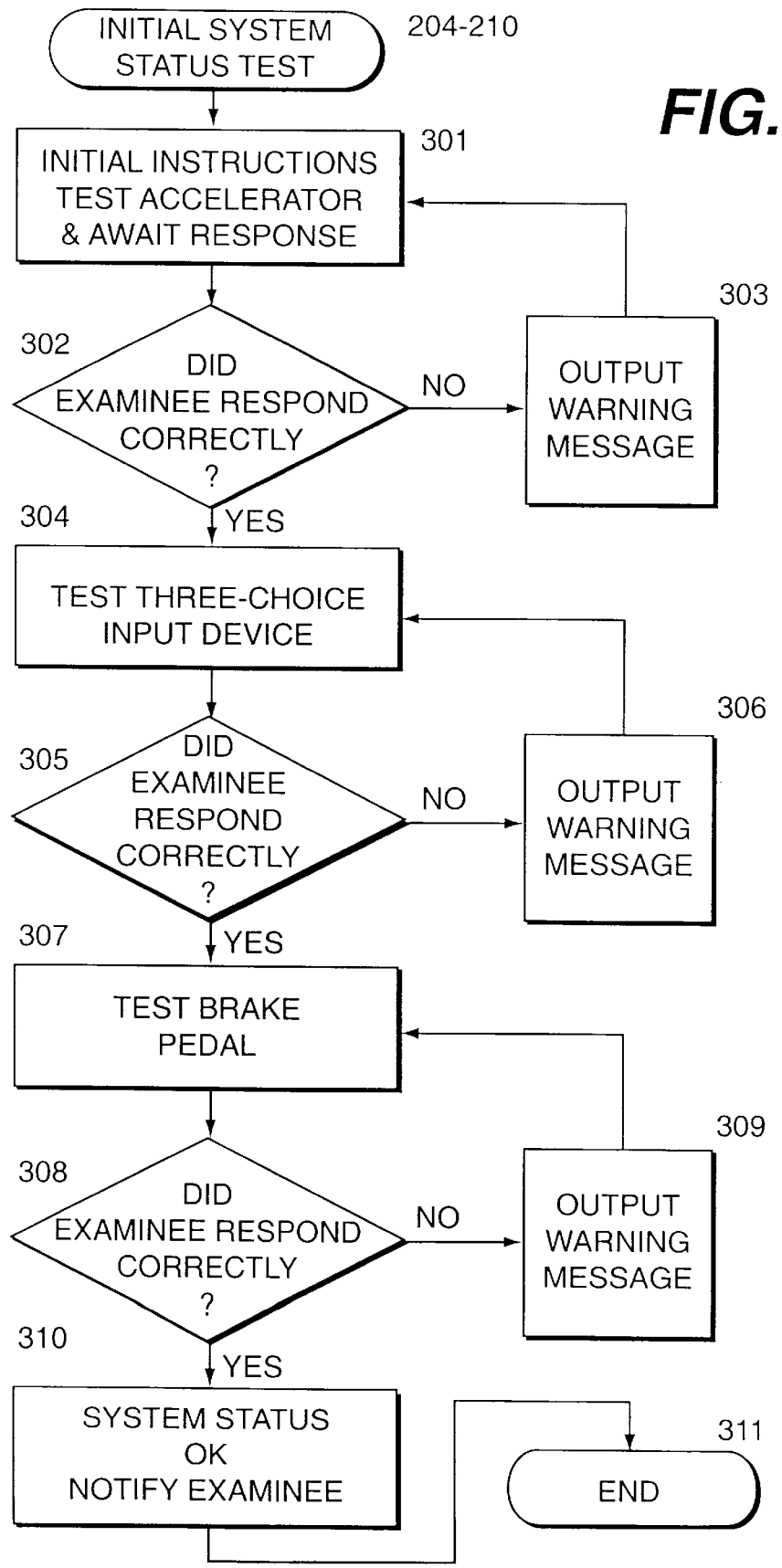
FIG. 4 shows a flow chart of the specific operation of the steps for conducting the initial functionality and system status test of the user input/interface devices.

As illustrated in FIG. 4, one detailed example for conducting the initial functionality and system status test (Steps 204–210) begins with outputting initial instructions (Step 301) to orient with test examinee TE and instruct him/her how to respond during this status check.

The system will then await a response from the test examinee TE by detecting the presence of the test examinee's foot on the accelerator pedal input device 20a for a predetermined time period T1 (Steps 302). If the test examinee TE does not follow instructions within that first predetermined time period T1, the system will then convey a prompting message to the examinee which repeats the instruction (Step 303).

When the test examinee TE complies with the instructions, the system will proceed with testing the three-choices input device 20c (Step 304). Confirmatory messages will be presented in sequence as the test examinee TE complies with pushing each response button in turn as instructed.

Similar to the above operation, the system will wait for a predetermined time period T2 while monitoring for a signal from the three-choice input device 20c that corresponds with the correct button being pushed (Step 305). Otherwise, if the wrong button is pushed or if no signal is received within the predetermined time period T2, the system will repeat the instruction (Step 306).

Once the test examinee TE complies with pressing the last response button, the system proceeds to testing the brake pedal input device 20b (Step 307) in the sequence.

After outputting an instruction message to the test examinee TE to briefly tap the brake pedal and then return his/her foot to the accelerator, the system then awaits the compliance of the test examinee TE by monitoring for the occurrence of the accelerator pedal input device 20a being released, the brake pedal 20b being depressed and then released, and the accelerator pedal input device 20a being depressed again in sequence (Step 308). The system may either monitor for that sequence or steps to occur within a single predetermined time period T3 or for each action in the sequence to occur within a separate predetermined time period T3'. If the test examinee does not follow the sequence of actions correctly or does not respond to the instructions at all, the system will repeat the message for the test examinee to please shift his/her right foot from the accelerator pedal to the brake pedal, and then return it to the accelerator (Step 309).

Once the system status test is completed and the system 10 determines that the input devices 20a–20c are nominally operational, the system will notify the test examinee TE that everything is working properly (Steps 310, 311). The system 10 will then proceed with administering the visual test sequence.

Figure 5A:
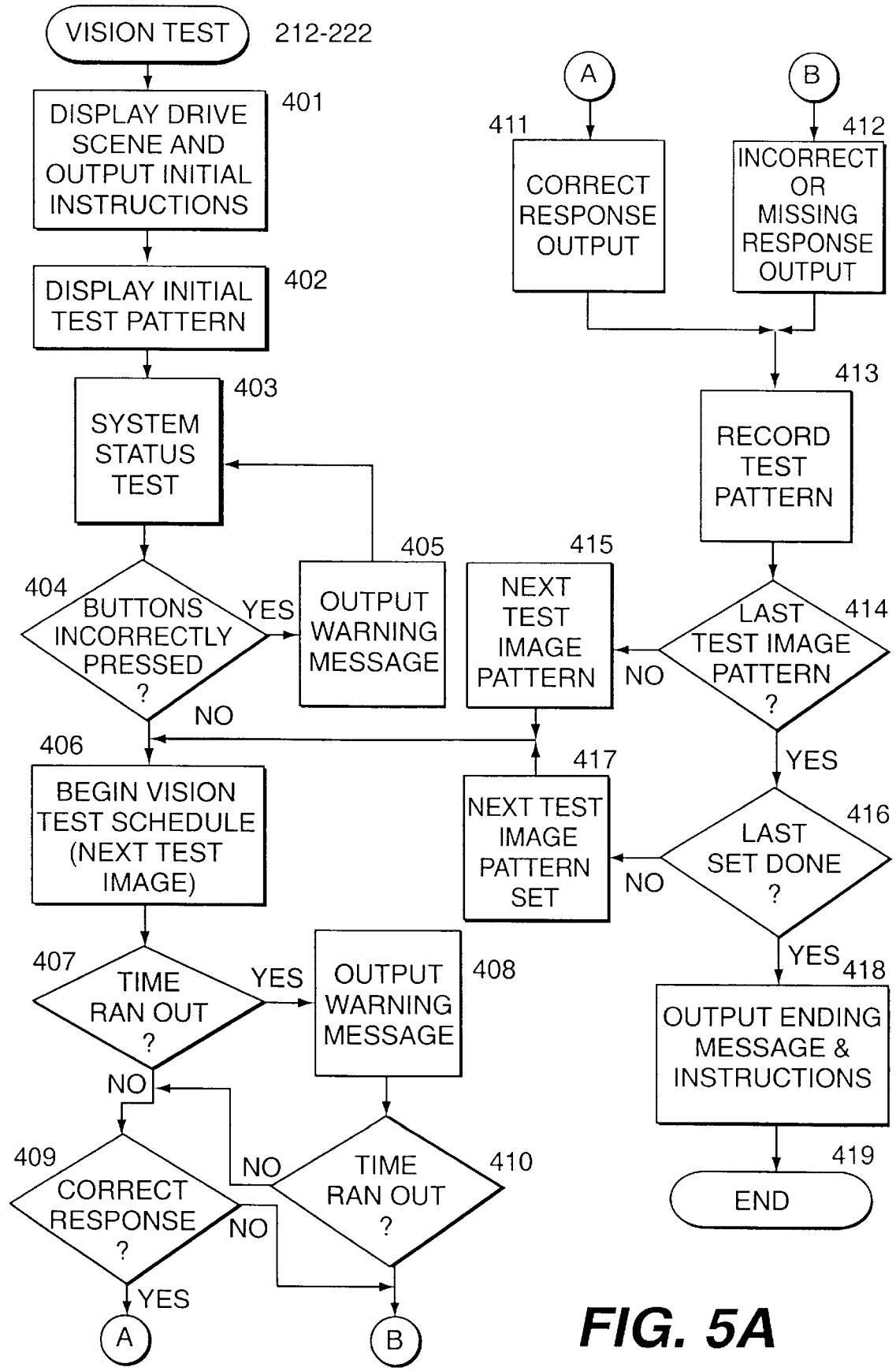
FIG. 5A shows a flow chart of the specific operation of the steps for administering the vision test sequence.

Within the general steps of administering the visual test sequence, FIG. 5A illustrates one example for a detailed operation of the steps associated with the vision test sequence (Steps 212–222). During the vision test sequence, the system 10 will selectively access the test program storage and playback device 18, whereby the video image of a typical traffic situation will initially be presented, such as the image, from a driver's perspective, of a road in a city that includes conventional road signs, traffic signals, roadside buildings, pedestrians and other vehicles (Step 401). Introductory remarks and instructions may also be given to the test examinee TE through audio and visual messages at this point.

The traffic video image will then incorporate a selected stationary image test pattern (also accessed from the test program storage and playback device 18) overlaid or incorporated in the overall traffic image as, for example, either a traffic light or a traffic sign (Step 402). If the image test pattern is displayed as part of a traffic light, the examinee will be told that two faces on this traffic signal will remain empty, while one will be filled with a test pattern of vertical bars, And that he/she is to push button 1, 2 or 3 on the response pad (device 20c) to indicate which signal face contains the test pattern.

At this stage before the actual test sequence, the system 10 will monitor whether or not any of the buttons of the three-choice input device 20c are being incorrectly pressed (Step 403), in order to determine if the three-choice input device 20c is ready to input data into the system 10 (See Steps 214–218 of FIG. 3). If the system detects any buttons being pressed, the test examinee will be given a message (Steps 404, 405) stating that he/she should not be pressing any buttons at this time, and should wait until asked to respond before doing so.

At the beginning of the actual vision test sequence, an initialization message will be outputted, instructing the examinee to watch as a test pattern appears, and to then respond accordingly.

At this point, the traffic video image will incorporate the same or another selected image test pattern overlaid or incorporated in the overall traffic image as part of, in this example, a traffic light (Step 406). While displaying that image test pattern, the system will at the same time monitor for the inputting of a response by the test examinee TE for a predetermined time period (e.g., 5 seconds) (Steps 407). If the test examinee TE fails to respond within that time period (Step 408), the examinee will be prompted with a message to immediately respond or else the question will be scored as incorrect.

The system will again monitor for the inputting of a response by the test examinee TE for another predetermined time period (e.g., 2 seconds) (Step 410). Should the test examinee TE fail to press any buttons on the three-choice input device 20c, the system will record such a non-response accordingly in memory (e.g., as an incorrect response), and proceed with the remainder of the test sequence (Steps 410, 412, 413).

Otherwise, if the test examinee TE does respond by pressing one of the buttons on the three-choice input device 20c, then the system determines if the inputted answer is correct relative to the image test pattern displayed (Step 409). The system will then provide audio and/or visual feedback to the test examinee, confirming which button was pushed and whether that response was correct (Step 411) or incorrect (Step 412).

Accordingly, the results of each tested image pattern is recorded in memory (Step 413). The above sequence of steps will repeat for a first set of selected repetitions R1 using other different stationary image test patterns (Steps 414, 415, 406–413). Once the selected number of repetitions or image test patterns are displayed and tested, the vision test sequence will proceed to a second set of selected repetitions R2 (Steps 414, 416, 417, 406–415). These repetitions will proceed in exactly the same manner, except that the visual test stimulus (i.e., the traffic signal light) will be moving.

As with the first set, the video image of a typical traffic situation will be presented, such as the image, from a driver's perspective, of a road in a city that includes conventional road signs, traffic signals, roadside buildings, pedestrians and other. The traffic image will then incorporate a selected image test pattern overlaid or incorporated in the overall traffic image as, for example, either a traffic light or a traffic sign, except that the image test pattern will be moving, such as to simulate the relative movement of a traffic light as one passes by while driving. Again, at the beginning of this vision test sequence, test the examinee will be instructed to watch as a test pattern appears, and to then respond (Step 406).

The traffic video image will then incorporate selected moving image test patterns overlaid or incorporated in the overall traffic image. While displaying that image test pattern (Step 406), the system will at the same time monitor for the inputting of a response by the test examinee TE for a predetermined time period T4 (e.g., 5 seconds) (Step 407). If the test examinee TE fails to respond within that time period T4, the examinee will be prompted to respond immediately or else the question will be scored as incorrect (Step 408).

The system will again monitor for the inputting of a response by the test examinee TE for another predetermined time period T4'(e.g., 2 seconds) (Step 410). Should the test examinee TE fail to press any buttons on the three-choice input device 20c, the system 10 will record such a non-response accordingly in memory (Steps 412, 413), and proceed with the remainder of the test sequence.

As with the first set of image test patterns, if the test examinee TE does respond by pressing one of the buttons on the three-choice input device 20c, the system determines if the inputted answer is correct relative to the image test pattern displayed (Step 409). The system will then provide audio feedback to the examinee, confirming which button was pushed and whether that response was correct (Step 411) or incorrect (Step 412).

The above sequence of steps will repeat for the second set of selected repetitions R2 using other different moving image test patterns (Steps 416, 417, 406–415). Once the selected number of image test patterns are displayed and tested, the system will inform the examinee that the vision test sequence has been completed (Step 418), and will proceed to the driving reaction test.

As each image test pattern is displayed and tested for, with both the first and second sets of image test patterns, data on the inputted answers of the test examinee TE are stored in memory (Step 413) including whether the inputted answer was correct or incorrect and the time elapsed before the answer was inputted through the three-choice input device 20c.

Figure 5B:
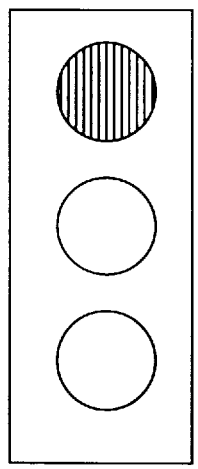
FIGS. 5B–5D illustrate test patterns used in the vision test sequence.
Figure 5C:
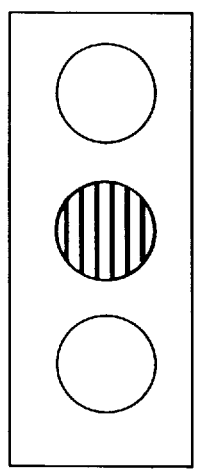
Figure 5D:
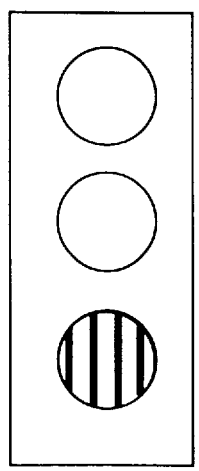

FIGS. 5B–5D illustrate different examples of image test patterns used in the vision test sequence. The test patterns may differ in shape, size, brightness/contrast, color and sharpness/resolution. For example, the test patterns in FIGS. 5B–5D differ from one another in the width and spacing of their vertical lines. The differences in the test patterns, along with the location and duration of their presentation as well as the test patterns being stationary or moving, permit the testing of different visual functions and capabilities, including static acuity, dynamic acuity, static contrast sensitivity, dynamic contrast sensitivity and angular motion sensitivity. The different types of test patterns that are applicable to the visual test sequence of the present invention include all visual patterns for testing various visual functions and capabilities known in the art.

As noted above, in testing for both static and dynamic visual functions and capabilities, the vision test in at least this first embodiment uses both stationary and moving test image patterns. These test image patterns are tested, in this first embodiment, through the administration of two separate portions or phases of the vision test. In order to implement the above-discussed vision test accordingly, one example test procedure using test image patterns such as those shown in FIGS. 5B–5D is organized as follows:

STATIC ACUITY TEST

At full contrast (bars=256, gaps=0), stimulus pattern in test image of traffic signal face is randomly positioned in one of three positions thereon. For a total of nine (9) trials, three (3) repetitions are conducted at the following spatial frequencies:

| (1) | 20/40  | 15 cycles/degree |
| (2) | 20/100 | 6 cycles/degree  |
| (3) | 20/200 | 3 cycles/degree  |

STATIC CONTRAST SENSITIVITY

For a total of twelve (12) trials, stimulus pattern in test image of traffic signal face is randomly positioned in one of three positions thereon at both low contrast ($\approx 1\%$) and intermediate contrast ($\approx 10\%$) with three (3) repetitions conducted at the following spatial frequencies:

(1) 6 cycles/degree (2) 15 cycles/degree

DYNAMIC ACUITY TEST

At full contrast (bars=256, gaps=0), stimulus pattern in test image of traffic signal face is randomly positioned in one of three positions thereon with a rate of motion of $\approx 20$ degrees/cycle. For a total of nine (9) trials, three (3) repetitions are conducted at the following spatial frequencies:

(1) 20/40

(2) 20/100

(3) 20/200

DYNAMIC CONTRAST SENSITIVITY

For a total of twelve (12) trials, stimulus pattern in test image of traffic signal face is randomly positioned in one of three positions thereon at both low contrast ($\approx 1\%$) and intermediate contrast ($\approx 10\%$) with a rate of motion of 10 degrees/sec. Three (3) repetitions are conducted at the following spatial frequencies:

(1) 6 cycles/degree;

(2) 15 cycles/degree.

Other test procedures as known in the art and as would be understood by one of skill in the art given this disclosure may also be used.

Figure 6:
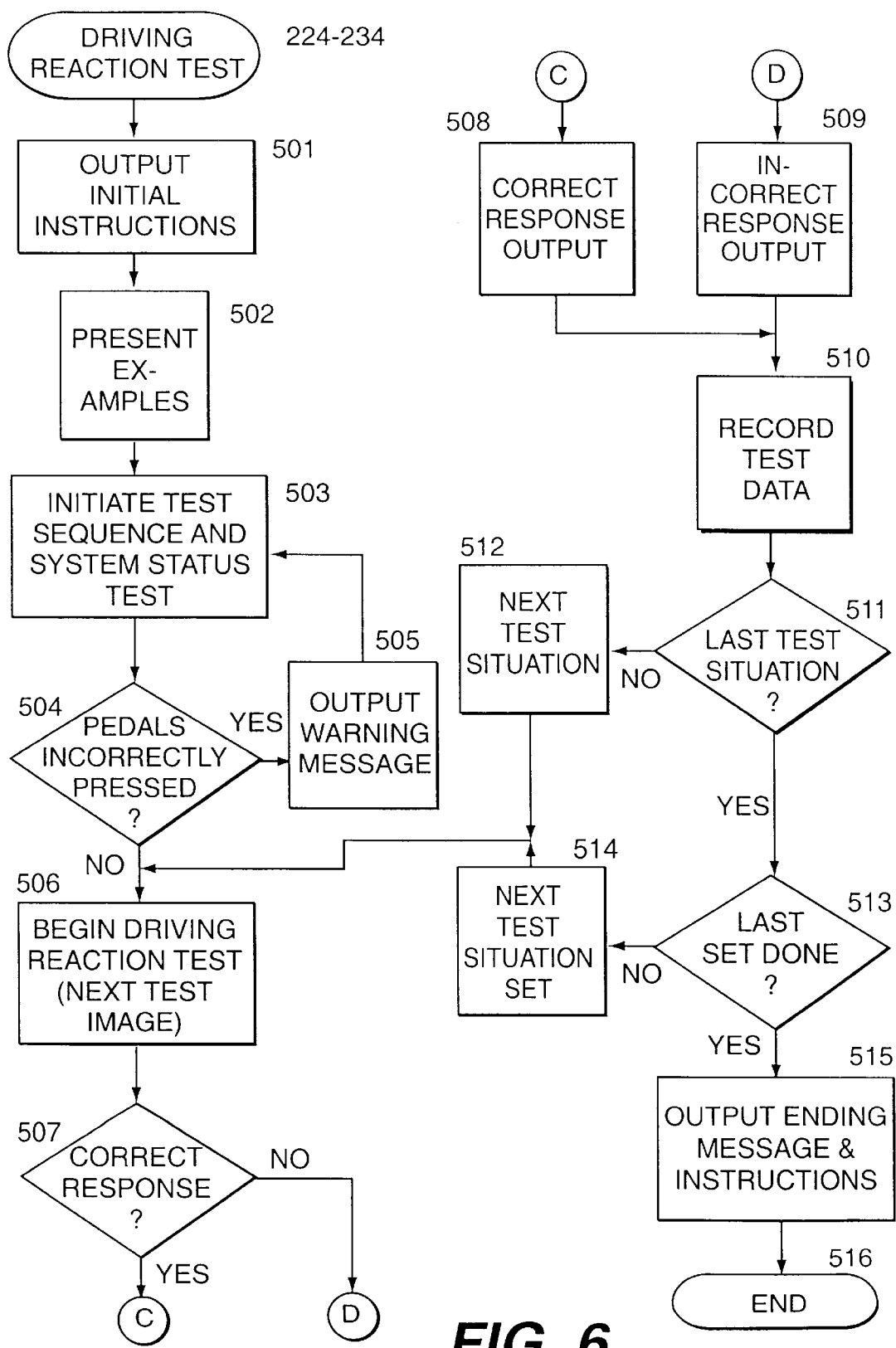
FIG. 6 shows a flow chart of the specific operation of the steps for administering the driving reaction test sequence.

In the general steps of administering the driving reaction test sequence (Steps 224–234), FIG. 6 illustrates one detailed example for conducting this test sequence. As shown, the test examinee TE is first given introductory instructions for this test sequence Step 501). The test examinee is instructed to watch the recorded driving scenes, and to use his/her right foot to tap the brake pedal as soon as possible at any time when it would be appropriate to brake if actually driving; such as, if the brake lights appear on a car in the same lane a short distance ahead. After each tap of the brake, the examinee must then return his/her foot to rest on the accelerator.

As part of the test sequence, examples may be presented to explain how to respond to this test (Step 502). The image of the narrator and/or an audio message describing the different types of situations in which tapping the brake pedal would be an appropriate response would be presented, or video images of the different situations may be shown with audio messages from the narrator introduced in between video images to further explain each situation. Situations that the driving reaction test sequence would present include situations in which a vehicle a short distance ahead applies its brakes, and situations in which hazards or obstacles exist, are entering, or are about to enter the roadway in one's travel path. The obstacles or hazards include other vehicles, pedestrians, cyclists, animals or inanimate objects.

When the actual test sequence begins (Step 503), the examinee will be reminded to tap the brake pedal as quickly as possible under any circumstance where it would be necessary to brake if actually driving, and to then always return his/her foot to the accelerator pedal.

As a system status test (see Steps 226–230), the system 10 will detect whether the test examinee TE properly has his/her foot on the accelerator pedal 20a and/or whether the brake pedal 20b is being improperly depressed (Step 504). If the proper signals are not being detected from the corresponding pedals, the system 10 will generate and convey the appropriate warning message to the examinee, by displaying the image of the narrator and/or an audio message (Step 505).

The system 10 will then access the test program storage and playback 18 and initiate video images of the different situations such as those cited above (Step 506). For example, one testing situation would be to show a video of driving along a highway or other open roadways from the driver's view in the car. In that situation, there is at least one car or other vehicle in front in the same or an adjacent lane. As the video is being shown, the system 10 is coordinated with the video such that when the video shows that other vehicle either slowing down, braking (thereby showing its brake lights on) or changing lanes suddenly, a timer is activated to time how long the test examinee TE takes to react and depress the brake pedal (Step 507).

If the test examinee TE reacts within a predetermined time period T5 (e.g., 5 seconds) of the start of any of the above occurrences, feedback will be provided to the examinee confirming that the brake lights on the car ahead went on, and that he/she reacted appropriately (Step 508).

The test sequence will then continue and show a video of the next situation to be tested (Steps 511, 512). If, however, the test examinee TE did not respond within the predetermined time period T5, feedback will be provided prompting the examinee with the message that the brake lights on the car ahead went on, but he/she did not react in time, and to remember to tap the brake pedal as quickly as possible at any time it would be necessary to brake if actually driving.

Again, the test sequence will then continue and show a video of the next situation to be tested (Steps 511, 512). As each situation is tested, the system records in memory whether or not the test examinee TE responded within the predetermined time period, and the time the test examinee TE took to actually respond (Step 510).

In the example given above, the feedback messages of the narrator were directed to those situations that test driver reaction to seeing a lead car's brake lights. With video images in which driver reaction to other situations is being tested (i.e., the other car slowing down, another car changing lanes suddenly, an obstacle or hazard appearing in the roadway), the system will similarly provide feedback to the test examinee when he/she either responds or fails to respond within the predetermined time period.

After a predetermined number of situations S1 related to driving on the open road or highway are tested, the test sequence will shift to testing situations wherein driving is being conducted in a heavier traffic environment, such as in a busy shopping center, in a busy downtown section of a city, in a residential area or in other similar traffic environments (Steps 513, 514).

The test program storage and playback 18 will be accessed to display the appropriate video images. Such situations include pedestrians of all sizes stepping in front of the car, cyclists cutting in front of the car, other vehicles approaching from side roadways, inanimate objects falling or moving in front of the car, and stationary objects used for traffic control, such as stop signs, speed bumps and construction barriers/signs. The different objects or obstacles that may be introduced will vary in duration and location within the driving scene of the video images, along with varying in size, motion, resolution and brightness/contrast. As with the first portion of this test sequence, a predetermined number of such situations will be presented and tested (Steps 506–509). At the same time, the system will continue recording the reactions of the test examinee TE in memory (Step 510).

In addition to having the test examinee TE respond to the above-discussed situations by pressing the brake pedal at the appropriate time, the driving reaction test sequence may also, or as an alternative, have the test examinee TE use the three-choice input device 20c again to input responses to images shown in a driving scene similar to the vision test sequence outlined above. Instead of image test patterns, the system 10 would incorporate images of highway signs artificially created for the test and not used in standard highway operations. As with the vision test sequence, the system 10 would monitor how long the test examinee TE takes to respond when those highway sing images are presented, whether the test examinee inputs the proper response. The different highway sign images will also vary in duration and location within the driving scene of the video images, along with varying in size, motion, resolution and brightness/contrast.

The different situations presented in the driving reaction test sequence are directed to testing, among other functional capabilities, divided attention capacity, selective attention capacity, attention switching, working memory functions, brake reaction time, and complex reaction time and decision making. Other situation tests may be used to test the above-noted functional capabilities, and other functional capabilities in addition to those mentioned above may be tested as one of ordinary skill in the art would understand when applying and implementing the present invention.

At the end of the driving reaction test sequence, in the step of the acknowledgment protocol of completion of the test (Step 236 of FIG. 3), video and audio messages extracted from the test program storage and playback device 18 are given to the test examinee TE to let the test examinee know that the tests have finished and to give the test examinee any final instructions before leaving the test site (Step 515).

In all of the test sequences discussed above, images of cars or other vehicles braking (brake lights coming on), other vehicles changing lanes, various hazards or obstacles entering or approaching the roadway being traveled, test image patterns, highway sign images and even images of the narrator are being incorporated into the video images being presented to the test examinee TE in conjunction with the driving scene. Such test images may be superimposed, overlaid, added or computer-generated to the driving scene video images using any conventional technique known in the art. Alternatively, the video images made completely from choreographed situations may be used, as filmed.

As discussed above, the results of the vision test sequence and the driving reaction test sequence are recorded in the memory of the system 10. Those results may be outputted (e.g., hardcopy printout, displayed on a monitor) in raw form (i.e., pure data, numbers) or may be processed by the system before being outputted. As one of skill in the art would understand, those test results may be processed and correlated to, among other analyses, pass/fail determinations, percentage scores for specific portions/phases of either test sequence, and the identification of specific errors for individual stimuli or test image patterns.

Although the present invention has been fully described in connection with a preferred embodiment thereof with reference to the accompanying drawings, it is to be noted that various changes and modifications are apparent to those skilled in the art. For example, instead of using stand-alone computers to implement the invention, the system may consist of a computer network with a file server connected to a plurality of terminals. Each terminal would include a display, the input/interface devices and a local CPU circuit that received, transmitted or processed data with the central file server in running the test sequences.

As noted earlier, other test image patterns, test procedures and situation tests may be incorporated, and other visual capabilities and functional capabilities may be tested in addition to those discussed above. In addition, though the preferred embodiment operated the visual test sequence before the driving reaction test sequence, one of skill in the art would understand that the order of the test sequences may be switched. Further, the operation of the system may include the use of more than two test sequences, wherein different combinations and orders of visual and driving reaction test sequences are implemented. Even more, each separate test sequence may even consist of a combination of individual visual and driving reaction tests. Each separate test sequence may also consist of varying numbers of individual visual and driving reaction tests (e.g., varying numbers of visual test image patterns and/or driving reaction test situations). The order and number of test sequences and individual tests would depend on the requirements of the particular application of the present invention, as would be understood by one of skill in the art. These and other changes and modifications are to be understood as included within the scope of the present invention as defined by the appended claims, unless they depart therefrom.

What is claimed is:

1. A system for testing and evaluating driver situational awareness, comprising:
    means for displaying road and traffic images to a subject being tested;
    means for generating road and traffic image data for simulating operation of a vehicle to be outputted on said display means;
    means for generating instruction data to be outputted at least on said display means;
    means for inputting response data from said test subject in response to said generated road and traffic image data on said display means; and
    means for controlling operation of said display means, said image data generating means, said instruction data generating means and said inputting means, said controlling means including a vision test component for conducting a vision test of said subject and a driving reaction test component for conducting a driving reaction test of said subject, wherein
    said vision and driving reaction test components are operatively connected to said image data generating means, said instruction data generating means and said inputting means such that image data and instruction data are generated and displayed in coordination with vision and driving reaction test sequences conducted by said vision and driving reaction test components, respectively, and response data inputted through said inputting means.

2. A system according to claim 1, wherein said displaying means includes a display monitor.

3. A system according to claim 1, wherein said image data generating means includes at least one of road and traffic video image data, test pattern image data and situation test image data.

4. A system according to claim 3, wherein at least said test pattern image data is structured to test at least one of static visual acuity, static visual contrast sensitivity, dynamic visual acuity and dynamic visual contrast sensitivity.

5. A system according to claim 3, wherein at least said situation test image data is structured to test at least one of divided attention capacity, selective attention capacity, attention switching, brake reaction time, and complex reaction time and decision making.

6. A system according to claim 1, wherein said instruction data generating means includes instruction image data for providing instructions to said subject for operation of said vision and driving reaction test components.

7. A system according to claim 1, further comprising:
    means for outputting audio messages in coordination with said display means, wherein said instruction data generating means includes instruction image data and audio message data corresponding to said instruction image data for providing instructions to said subject for operation of said vision and driving reaction test components.

8. A system according to claim 1, wherein said inputting means includes at least one of an accelerator pedal simulating input device, a brake pedal simulating input device and a multiple-choice input device for inputting response data from said test subject in response to operation of said vision and driving reaction test components.

9. A system according to claim 1, wherein said controlling means includes a data-processing circuit device operatively connected to said display means, to a data storage device having said image data generating means and said instruction data generating means and to said inputting means.

10. A method for testing and evaluating driver situational awareness; comprising the steps of:
    providing a display through which road and traffic image data and instruction data is presented to a subject to be tested;
    conducting a vision test sequence with said subject;
    conducting a driving reaction test sequence with said subject; and
    providing input devices through which said subject may respond to said vision and driving reaction test sequences, wherein said steps of conducting a vision or driving reaction test sequence each includes the steps of generating road and traffic image data for simulating operation of a vehicle to be presented on said display, generating instruction data in coordination with said image data for providing instructions for said subject during said vision and driving reaction test sequences, monitoring for inputting of response data during said vision and driving reaction test sequences, and determining whether said inputted response data is correct or incorrect.

11. A method according to claim 10, wherein said step of conducting said vision test sequence includes the steps of:

generating road and traffic image data for simulating operation of a vehicle including test image pattern data on said display, generating instruction data in coordination with said image data and said test image pattern data for providing instructions for said subject during said vision test sequence, monitoring for inputting of response data in response to said test image pattern data, and generating further instruction data based on said step of determining whether said inputted response data is correct or incorrect.

12. A method according to claim 11, wherein said step of generating road and traffic image data including test image pattern data further includes generating test image pattern data for testing at least one of static visual acuity, static visual contrast sensitivity, dynamic visual acuity and dynamic visual contrast sensitivity.

13. A method according to claim 10, wherein said step of conducting said driving reaction test sequence includes the steps of:

generating road and traffic image data for simulating operation of a vehicle including situation test image data on said display, generating instruction data in coordination with said image data and said situation test image data for providing instructions for said subject during said driving reaction test sequence, monitoring for inputting of response data in response to said situation test image data, and generating further instruction data based on said step of determining whether said inputted response data is correct or incorrect.

14. A method according to claim 13, wherein said step of generating road and traffic image data for simulating operation of a vehicle including situation test image data further includes generating situation test image data for testing at least one of divided attention capacity, selective attention capacity, attention switching, brake reaction time, and complex reaction time and decision making.

* * * * *